US008410187B2

(12) United States Patent
Sakaguchi et al.

(10) Patent No.: US 8,410,187 B2
(45) Date of Patent: Apr. 2, 2013

(54) POLYVINYLIDENE FLUORIDE RESIN EXPANDED BEADS, AND MOLDED ARTICLES OF POLYVINYLIDENE FLUORIDE RESIN EXPANDED BEADS

(75) Inventors: Masakazu Sakaguchi, Yokkaichi (JP); Kouki Nishijima, Yokkaichi (JP); Masaharu Oikawa, Yokkaichi (JP)

(73) Assignee: JSP Corporation, Tokyo (JP)

( * ) Notice: Subject to any disclaimer, the term of this patent is extended or adjusted under 35 U.S.C. 154(b) by 40 days.

(21) Appl. No.: 13/255,213

(22) PCT Filed: Mar. 5, 2010

(86) PCT No.: PCT/JP2010/001561
§ 371 (c)(1),
(2), (4) Date: Sep. 7, 2011

(87) PCT Pub. No.: WO2010/103771
PCT Pub. Date: Sep. 16, 2010

(65) Prior Publication Data
US 2011/0319512 A1 Dec. 29, 2011

(30) Foreign Application Priority Data

Mar. 10, 2009 (JP) ................................. 2009-057134

(51) Int. Cl.
*C08F 14/22* (2006.01)
*C08F 114/22* (2006.01)
*C08J 9/08* (2006.01)

(52) U.S. Cl. ......... 521/145; 521/140; 526/242; 526/255

(58) Field of Classification Search .................. 521/145, 521/140; 526/255, 242
See application file for complete search history.

(56) References Cited

U.S. PATENT DOCUMENTS 4,425,443 A * 1/1984 Georlette et al. ............... 521/93
6,051,617 A * 4/2000 Sasaki et al. .................... 521/59
(Continued)

FOREIGN PATENT DOCUMENTS
JP    A-49-2183    1/1974
JP    B2-56-1344   1/1981
(Continued)

OTHER PUBLICATIONS

International Search Report dated May 18, 2010 in International Application No. PCT/JP2010/001561 (with translation).
(Continued)

*Primary Examiner* — Randy Gulakowski
*Assistant Examiner* — Kara Boyle
(74) *Attorney, Agent, or Firm* — Oliff & Berridge, PLC

(57) ABSTRACT

Provided are polyvinylidene fluoride resin expanded beads which can be molded by in-mold molding and thus stably provide, without impairing excellent characteristics inherent in polyvinylidene fluoride resin, molded articles having excellent mechanical properties. Polyvinylidene fluoride resin expanded beads, characterized in that when 1 to 3 mg of the expanded beads are subjected to heat-flux type differential scanning calorimetry (DSC) wherein the beads are heated from 25° C. to 200° C. at a temperature rise rate of 10° C./min, the obtained DSC curve (of first heating) has both an inherent endothermic peak which is inherent in polyvinylidene fluoride resin and one or more higher-temperature endothermic peaks which appear on the higher-temperature side of the inherent endothermic peak, the quantity of heat of melting of the higher-temperature endothermic peaks being at least 0.5 J/g.

10 Claims, 2 Drawing Sheets

U.S. PATENT DOCUMENTS

2007/0293592 A1 12/2007 Jacobs et al.
2010/0105787 A1 4/2010 Sasaki et al.

FOREIGN PATENT DOCUMENTS

| JP | B2-62-61227 | 12/1987 |
| JP | B2-4-46217 | 7/1992 |
| JP | B2-6-49795 | 6/1994 |
| JP | A-7-11037 | 1/1995 |
| JP | A-7-26051 | 1/1995 |
| JP | A-9-104026 | 4/1997 |
| JP | A-9-104027 | 4/1997 |
| JP | A-9-324066 | 12/1997 |
| JP | A-10-180888 | 7/1998 |
| JP | A-2007-534823 | 11/2007 |
| WO | WO 2009/001626 A1 | 12/2008 |

OTHER PUBLICATIONS

International Preliminary Report on Patentability issued Oct. 18, 2011 in International Patent Application PCT/JP2010/001561 (with translation).

* cited by examiner

POLYVINYLIDENE FLUORIDE RESIN EXPANDED BEADS, AND MOLDED ARTICLES OF POLYVINYLIDENE FLUORIDE RESIN EXPANDED BEADS

TECHNICAL FIELD

The present invention relates to expanded polyvinylidene fluoride resin beads, and to a molded article of the expanded beads obtained by in-mold molding of the expanded beads.

BACKGROUND ART

Polyvinylidene fluoride resins are used as non-contaminating materials for parts in clean rooms and high-performance analysis devices, and the like; furthermore, they have excellent weather resistance and are also used for exterior-quality paints. Furthermore, polyvinylidene fluoride resins are also excellent in fire retardancy, and are used for fire-retardant uses that utilize advanced fire retardancy.

As an example of a foamed polyvinylidene fluoride resin body, a foamed body obtained by subjecting a polyvinylidene fluoride resin as a raw material to a crosslinking treatment, kneading a heat-decomposition blowing agent that can be decomposed at the melting temperature of the raw material resin, molding the resin into a sheet, a rod or the like, and foaming by heating, is known. Furthermore, a process of incorporating a blowing agent into a raw material polyvinylidene fluoride resin, molding the kneaded resin into a sheet, a rod or the like, and performing a crosslinking treatment to heat-expand the molding to give a foamed body, and the like are known.

For example, Patent Document 1 shows a process for obtaining a foamed article of kneading a chemical blowing agent in advance into a raw material resin obtained by electron beam crosslinking of a polyvinylidene fluoride resin, molding the kneaded resin into a sheet, and heating the sheet to decompose the blowing agent. However, only a foamed sheet that has been molded into a sheet-like shape in advance can be obtained by this process, and the degree of freedom for the shape of a foamed article obtained by this process is poor. Furthermore, there is a problem that the foamed article has poor recyclability since the raw material resin is crosslinked. Furthermore, Patent Document 2 shows foamed article of sheet and the like made of a thermoplastic fluorine resin having no crosslinked structure. Also in Patent Document 2, the obtained foamed article is sheet, and the degree of freedom for the shape of a foamed article obtained by Patent Document 2 is poor.

PRIOR ART DOCUMENTS

Patent Documents

Patent Document 1: Japanese Patent Application Laid-Open. No. 7-11037
Patent Document 2: Japanese Patent Application Laid-Open No. 7-26051

SUMMARY OF THE INVENTION

Problem to be Solved by the Invention

However, these conventional polyvinylidene fluoride resin foamed article are all foamed articles that are obtained by molding into a sheet, a rod and the like. A foamed molded article having a desired shape, which is obtained by filling expanded beads into the mold cavity, a so-called molded article of expanded beads by in-mold molding, has not been found and carried out yet under the current circumstance.

Molded articles of expanded beads can be formed into desired shapes, and have advantages such as light weight, shock-absorbing property and heat insulating property, and molded articles of expanded beads of practical use have been desired since before.

The present invention aims at providing an expanded polyvinylidene fluoride resin beads, which can be used for the production of a molded article of polyvinylidene fluoride resin expanded beads having a desired shape obtained by in-mold molding.

Furthermore, the present invention aims at providing a molded article of polyvinylidene fluoride resin expanded beads, which is obtained by in-mold molding of expanded polyvinylidene fluoride resin beads.

Means for Solving the Problem

In order to attain the above-mentioned purposes of the present invention, the present inventors have done intensive studies on the thermal behavior of polyvinylidene fluoride resin expanded beads during a process from a melting state to solidification, the crystalline structure formed during the steps for the production of the expanded beads, and the expansion property and moldability of the expanded beads. As a result, they have found that expanded beads having a crystalline structure in which an endothermic peak that is inherent in the raw material polyvinylidene fluoride resin (inherent peak) and one or more endothermic peaks (high-temperature peaks) on the higher-temperature side than the inherent peak appear, wherein the peaks are observed in a DSC curve obtained by a heat flux differential scanning calorimetry of the expanded polyvinylidene fluoride resin beads, have fine expansion property and moldability, have done studies from various viewpoints on the expanded beads in which the above-mentioned high-temperature peaks appear, and completed the present invention.

That is, the present invention provides:

(1) Expanded polyvinylidene fluoride resin beads, wherein a DSC curve that is measured when from 1 to 3 mg of the expanded polyvinylidene fluoride resin beads are heated from 25° C. to 200° C. at a heating rate of 10° C./min by a heat flux differential scanning calorimetry (a DSC curve of first heating) has an endothermic peak that is inherent peak in the polyvinylidene fluoride resin (inherent peak) and one or more endothermic peaks (high-temperature peaks) on the higher-temperature side of the inherent peak, and the high-temperature peaks have calorific value of at least 0.5 J/g.

(2) The expanded polyvinylidene fluoride resin beads according to above (1) wherein a DSC curve that is measured when from 1 to 3 mg of the expanded polyvinylidene fluoride resin beads are heated from 25° C. to 200° C. at a heating rate of 10° C./min and cooled from 200° C. to 25° C. at a cooling rate of 10° C./min, and heated again from 25° C. to 200° C. at a heating rate of 10° C./min by a heat flux differential scanning calorimetry (a DSC curve of second heating) and the DSC curve of the first heating satisfy the condition of the following formula (1),

[Mathematical Formula 4]

$$0.5 \times B/A - 0.06 \leq D/C \leq 2 \times B/A - 0.3 \tag{1}$$

wherein A represents the total calorific value of the endothermic peak of the DSC curve of the second heating, B represents the calorific value on the higher-temperature side than the peak temperature of the endothermic peak having the maximum area of the DSC curve of the second heating, C represents the total calorific value of the endothermic peak of the DSC curve of the first heating, and D represents the calorific value of the high-temperature peaks in the DSC curve of the first heating, respectively.

(3) Expanded polyvinylidene fluoride resin beads, wherein a DSC curve that is measured when from 1 to 3 mg of the expanded polyvinylidene fluoride resin beads are heated from 25° C. to 200° C. at a heating rate of 10° C./min by a heat flux differential scanning calorimetry (a DSC curve of first heating) and a DSC curve that is obtained when the expanded polyvinylidene fluoride resin beads are cooled from 200° C. to 25° C. at a cooling rate of 10° C./min and heated again from 25° C. to 200° C. at a heating rate of 10° C./min after the first heating (a DSC curve of second heating) satisfy the condition of the following formula (1),

[Mathematical Formula 5]

$$0.5 \times B/A - 0.06 \leq D/C \leq 2 \times B/A - 0.3 \quad (1)$$

wherein A represents the total calorific value of the endothermic peak of the DSC curve of the second heating, B represents the calorific value on the higher-temperature side than the peak temperature of the endothermic peak having the maximum area of the DSC curve of the second heating, C represents the total calorific value of the endothermic peak of the DSC curve of the first heating, and D represents the calorific value of the high-temperature peaks in the DSC curve of the first heating, respectively.

(4) The expanded polyvinylidene fluoride resin beads according to above (2) or (3), wherein the total calorific value A of the endothermic peak and the calorific value B on the higher-temperature side than the peak temperature of the endothermic peak having the maximum area satisfy the condition of the following formula (2) in the DSC curve of the second heating.

[Mathematical Formula 6]

$$0.16 \leq B/A \leq 0.80 \quad (2)$$

(5) The expanded polyvinylidene fluoride resin beads according to above (1) or (3), wherein the polyvinylidene fluoride resin that composes the expanded polyvinylidene fluoride resin beads is a vinylidene fluoride-tetrafluoroethylene copolymer or a vinylidene fluoride-hexafluoropropylene copolymer.

(6) A molded article of expanded polyvinylidene fluoride resin beads, which is obtained by in-mold molding of the expanded polyvinylidene fluoride resin beads according to above (1) or (3).

Effect of the Invention

The expanded beads of the present invention are expanded beads that can be formed by in-mold molding, by which a molded article of expanded beads having a shape corresponding to the mold cavity can be obtained, and molded articles of expanded polyvinylidene fluoride resin beads having desired various shapes according to the purpose can be provided.

Furthermore, since the calorific value of the DSC curve of the above-mentioned first heating and the calorific value of the above-mentioned DSC curve of the second heating, which are measured in the heat flux differential scanning calorimetry of the expanded beads, satisfy a specific relationship, a molded article of expanded polyvinylidene fluoride resin beads having excellent appearance and mechanical properties can be provided.

Moreover, the molded article of the expanded beads of the present invention can save the weight of the molded article while substantially retaining excellent weather resistance and fire retardancy possessed by the polyvinylidene fluoride resin, and expanded molded articles of a polyvinylidene fluoride resin having various desired shapes, which could not been obtained before, can be obtained.

BEST MODES FOR CARRYING OUT THE INVENTION

Figure 1:
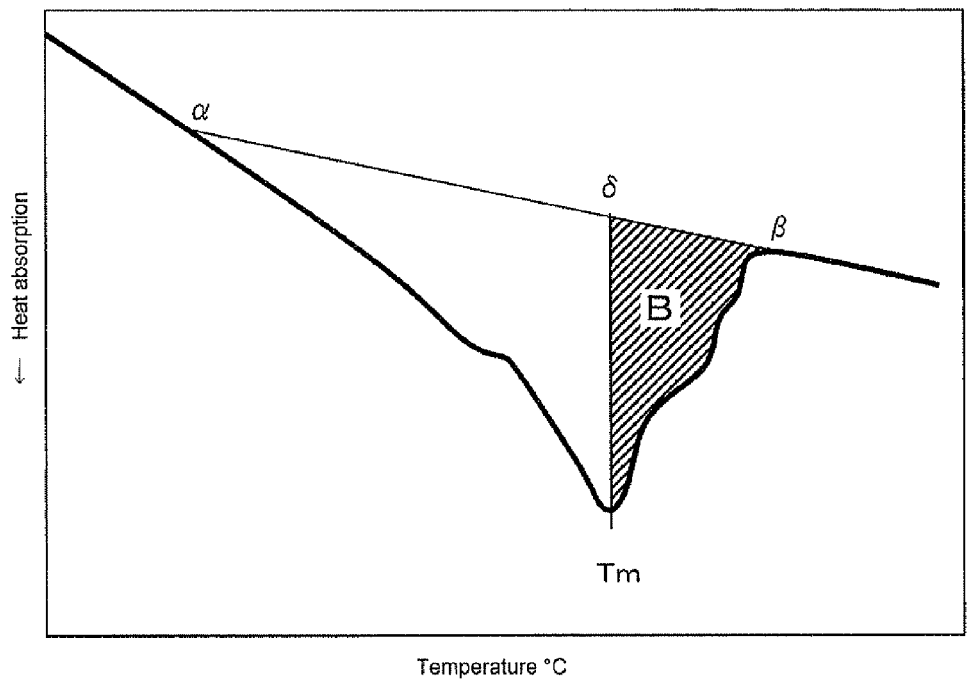
FIG. 1 is a drawing for explaining the calorific value B on the higher-temperature side than the peak temperature of the endothermic peak having the maximum area in the DSC curve of the second heating of the expanded beads according to the present invention.

In the present specification, the expanded polyvinylidene fluoride resin beads are sometimes simply referred to as "expanded beads". A molded article of the expanded polyvinylidene fluoride resin beads obtained by in-mold molding of the expanded beads is sometimes simply referred to as "a molded article of the expanded beads" or "a molded article". Furthermore, a DSC curve obtained by a heat flux differential scanning calorimetry is sometimes simply referred to as "a DSC curve".

The polyvinylidene fluoride resin that composes the expanded polyvinylidene fluoride resin beads of the present invention is used a base resin of vinylidene fluoride. It is not specifically limited with respect to the composition hereof and process for the production thereof, and for example, a vinylidene fluoride homopolymer, a vinylidene fluoride-tetrafluoroethylene copolymer, a vinylidene fluoride-hexafluoropropylene copolymer, a vinylidene fluoride-tetrafluoroethylene-hexafluoropropylene copolymer, and mixtures thereof, and the like can be used.

In view of that the high temperature is required and the cost increases in the step of producing the expanded beads and the step of molding the expanded beads mentioned below, because of high melting point of the resin when the polyvinylidene fluoride resin is a vinylidene fluoride homopolymer, a vinylidene fluoride-tetrafluoroethylene copolymer, a vinylidene fluoride-hexafluoropropylene copolymer, or mixtures of these and a vinylidene fluoride homopolymer are preferable.

As used herein, that vinylidene fluoride is used as a main component means that, in the case of a copolymer of vinylidene fluoride and other copolymerizable monomer, the vinylidene fluoride component included in the copolymer is at least 50% by weight or more, preferably 70% by weight or more.

Of these, in the case when performances of weather resistance and fire retardancy are specifically required, it is preferable that the main component of vinylidene fluoride is in the above-mentioned range, and the tetrafluoroethylene or hexafluoropropylene in the above-mentioned vinylidene fluoride-tetrafluoroethylene copolymer and vinylidene fluoride-hexafluoropropylene copolymer is included by a high copolymerization ratio.

Although the polyvinylidene fluoride resin that composes the expanded beads according to the present invention may be a non-crosslinked polyvinylidene fluoride resin, or, a crosslinking polyvinylidene fluoride resin, for example, that is crosslinked by a conventionally known process, a non-crosslinked polyvinylidene fluoride resin is preferable in view of recyclability, producibility of the expanded beads and the like.

The density of the polyvinylidene fluoride resin is approximately from 1.7 to 1.9 g/cm$^3$.

It is desirable that the polyvinylidene fluoride resin used in the present invention comprises 50% by weight or more of a resin having a melt flow rate (MFR) of preferably from 0.1 to 100 g/10 min, more preferably from 1 to 60 g/10 min. Within the above-mentioned range, resin beads are easily obtained by melt-kneading. The melt flow rate is a value measured under the test conditions of ASTM D1238 (temperature: 230° C., load: 5 kg).

In order for the expanded polyvinylidene fluoride resin beads in the present invention to be expanded beads that may be used for the production of a molded article of expanded polyvinylidene fluoride resin beads having a desired shape by an mold cavity, it is necessary to understand correctly the melting point of the polyvinylidene fluoride resin that composes the expanded beads.

In the present invention, the melting point of the polyvinylidene fluoride resin that composes the expanded beads can be measured from a DSC curve that is measured by heating 1 to 3 mg of the expanded beads from 25° C. to 200° C. at a heating rate of 10° C./min by a heat flux type differential scanning calorimetry, cooling from 200° C. to 25° C. at a cooling rate of 10° C./min, and heating again to 200° C. at a heating rate of 10° C./min (a DSC curve of the second heating). The peak temperature of the endothermic peak having the maximum area in the DSC curve of the second heating corresponds to the melting point of the polyvinylidene fluoride resin.

The polyvinylidene fluoride resin that composes the expanded beads in the present invention is preferably a polyvinylidene fluoride resin having a peak temperature of 170° C. or less in the above-mentioned DSC curve of the second heating, and more preferably, the peak temperature is desirably 165° C. or less. In addition, although the lower limit of said peak temperature is not specifically defined, it is preferably 120° C. or more, more preferably 130° C. or more in view of the practical heat-resistance of products.

In addition, in the above-mentioned DSC curve of the second heating, only an endothermic peak that is inherent peak in the polyvinylidene fluoride resin that composes the expanded polyvinylidene fluoride resin beads (inherent peak) appears. This inherent peak also appears in the DSC curve of the above-mentioned first heating measured by heating the expanded beads from 25° C. to 200° C. at a heating rate of 10° C./min. Although the peak temperature of the inherent peak sometimes slightly different between the first heating and second heating, and the difference is generally lower than 5° C., this endothermic peak (inherent peak) varies depending on the polymer ratio of the above-mentioned polyvinylidene fluoride resin.

In the expanded polyvinylidene fluoride resin beads of the present invention, in a DSC curve that is measured when from 1 to 3 mg of the expanded beads are heated from 25° C. to 200° C. at a heating rate of 10° C./min and cooled from 200° C. to 25° C. at a cooling rate of 10° C./min, and heated again from 25° C. to 200° C. at a heating rate of 10° C./min (a DSC curve of second heating) by a heat flux type differential scanning calorimetry, it is desirable that the calorific value B on the higher-temperature side than the peak temperature of the endothermic peak having the maximum area and the total calorific value A in the above-mentioned DSC curve of the second heating satisfy the condition of the following formula (2), further preferably condition of the formula (3).

[Mathematical Formula 7]

$$0.16 \leq B/A \leq 0.80 \quad (2)$$

Preferably,

[Mathematical Formula 8]

$$0.16 \leq B/A \leq 0.50 \quad (3)$$

wherein A and B in the above-mentioned formulas (2) and (3) are similar to those in the above-mentioned formula (1).

In the DSC curve of the second heating, the above-mentioned calorific value at the lower temperature side than the peak temperature of the endothermic peak having the maximum area affects softening of the expanded beads during molding. On the other hand, the calorific value on the higher-temperature side than the peak temperature of the endothermic peak having the maximum area affects melting of the expanded beads and mutual fusion bonding of the beads during molding. Therefore, when a molded article of expanded beads is to be obtained, in view of the heat behavior of the expanded beads during the in-mold molding, it is preferable to use a polyvinylidene fluoride resin having resin properties in which the calorific value at the above-mentioned lower-temperature side and the calorific value on the higher-temperature side are within the specific range represented by the above-mentioned formula (2), preferably by the formula (3). A molded article of expanded beads used the polyvinylidene fluoride resin having resin properties within the above-mentioned range can be obtained relatively readily from the expanded beads by in-mold molding.

Based on FIG. 1, the process for analyzing the above-mentioned peak temperature, and the process for analyzing the partial area of the calorific value B on the higher-temperature side are explained. In the DSC curve of the second heating of FIG. 1, the straight line α-β that connects the point α that corresponds to 80° C. on the DSC curve and the point β on the DSC curve that corresponds to the melt end temperature Te of the resin is drawn. Next, the peak of the endothermic peak is defined as Tm, and the temperature of this peak Tm is defined as the resin melting point. In addition, in the case when the DSC curve has plural endothermic peaks, the peak temperature of the endothermic peak having the maximum area is adopted.

Furthermore, a straight line that is in parallel to the vertical axis of the graph is drawn from the peak Tm, and the intersection with the above-mentioned straight line α-β is defined as δ. Furthermore, the area surrounded by the DSC curve, the line segment Tm-δ and the line segment δ-β is defined as B (calorific value B). Therefore, each calorific value of the calorific value B on the higher-temperature side and the calorific value at the lower-temperature side is calculated by a heat flux differential scanning calorimetric apparatus based on the area defined as mentioned above. In addition, the reason why the point α on the DSC curve was defined as a point corresponding to a temperature of 80° C. so as to draw the straight line α-β, a base line, in the above-mentioned measurement process is based on the finding of the inventors that a base line connecting a point corresponding to 80° C. as a starting point and a melt end temperature as an end point is preferable for obtaining the calorific value of the endothermic peak with fine reproducibility and stability.

Figure 2:
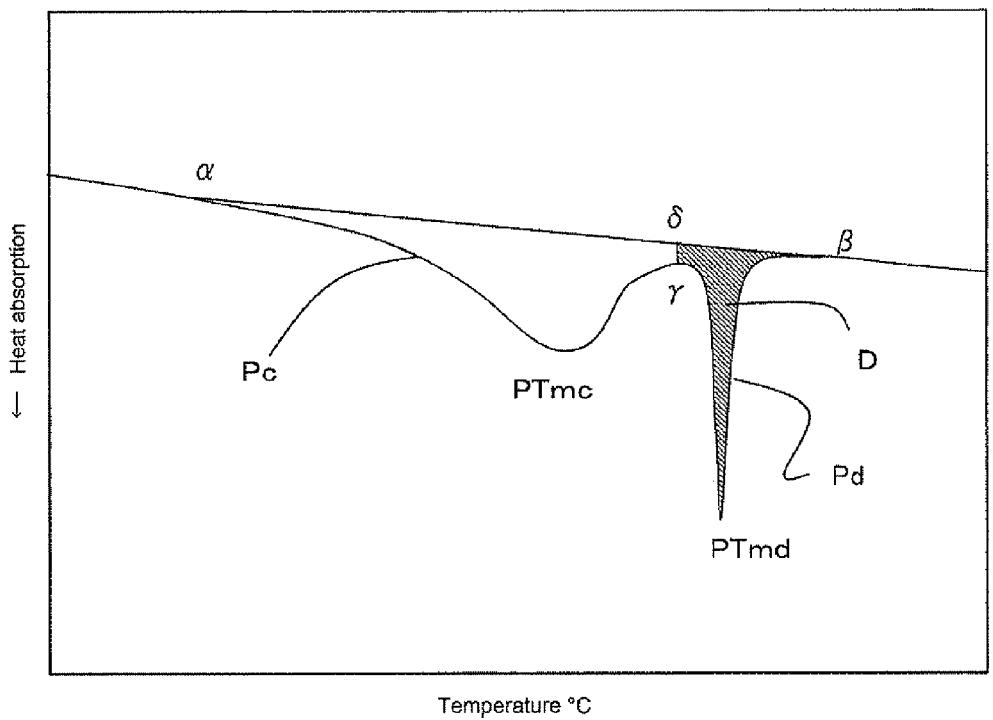
FIG. 2 shows the DSC curve of the first heating of the expanded beads according to the present invention.

For the endothermic peak in the DSC curve that is measured when from 1 to 3 mg of the expanded beads of the present invention are heated from 25° C. to 200° C. at a heating rate of 10° C./min (a DSC curve of first heating) by a heat flux differential scanning calorimetry, besides the endothermic peak that is inherent peak in the polyvinylidene fluoride resin that composes the expanded polyvinylidene fluoride resin beads (inherent peak), one or more endothermic peaks (high-temperature peaks) are also observed on the higher-temperature side than the endothermic peak (inherent peak) (FIG. 2). The high-temperature peaks appear by the change in the crystalline structure due to the preparation process during the production of the polyvinylidene fluoride resin expanded beads, and affect the blowing properties in the steps for the production of the expanded beads and the resin properties of the expanded beads during molding.

Furthermore, the expanded polyvinylidene fluoride resin beads have an endothermic peak that is inherent peak in the polyvinylidene fluoride resin (inherent peak) and one or more endothermic peaks (high-temperature peaks) on the high-temperature side of said inherent peak, and the high-temperature peaks have a calorific value of at least 0.5 J/g, in the DSC curve that is measured by heating from 25° C. to 200° C. at a heating rate of 10° C./min (a DSC curve of the first heating) by heat flux differential scanning calorimetry. When the calorific value of the high-temperature peaks is lower than 0.5 J/g, expanded beads that can be molded by in-mold molding cannot be obtained. The reason is that, since a crystalline component due to the higher-temperature peaks is in a small amount, the melting viscosity of the resin is low, and thus walls of cells are molten immediately after generation of the cells and adjacent cells are integrated with each other in the expansion step during the production of the expanded beads. Furthermore, the growth rate of the cells becomes too high, whereby the cells break. Therefore, in order to obtain expanded beads that can be molded by in-mold molding, the calorific value of the high-temperature peaks must have a calorific value of at least 0.5 J/g.

Furthermore, since the high-temperature peaks that are observed in the DSC curve of the first heating also affect the secondary expansion property of the expanded beads and the mechanical properties of the molded article of the expanded beads, the calorific value of said high-temperature peaks is preferably 1.0 J/g or more, more preferably 2.0 J/g or more. Although the upper limit of the calorific value of said high-temperature peaks is not specifically defined, when the calorific value of the high-temperature peaks is too high, moldability and the like may be affected, and thus the calorific value is preferably approximately 30 J/g or less, further preferably 11 J/g or less.

In the expanded beads of the present invention, at least one or more high-temperature peaks appear on the higher-temperature side of the inherent peak in the DSC curve of the first heating measured by the above-mentioned heat flux differential scanning calorimetry, and in the case when two or more of high-temperature peaks appear, the calorific value of said high-temperature peaks means the total calorific value of all of the high-temperature peaks. In the above-mentioned high-temperature peaks, the calorific value of the high-temperature peaks can be adjusted by the holding operation in the production of the expanded beads mentioned below.

The process for measuring the calorific value of the high-temperature peaks of the expanded beads in the present invention is explained by FIG. 2. In the DSC curve that is measured when from 1 to 3 mg of the expanded beads are heated from 25° C. to 200° C. at a heating rate of 10° C./min (a DSC curve of first heating) by a heat flux differential scanning calorimetry, an inherent peak Pc having a peak temperature PTmc that is inherent peak in the polyvinylidene fluoride resin appears. Furthermore, one or more endothermic peaks Pd each having a peak temperature PTmd appear on the high-temperature side temperature area of said inherent peak. Said endothermic peak Pd is the high-temperature peak in the present invention, and the area of said endothermic peak Pd corresponds to the calorific value D of the high-temperature peak of the expanded beads. Therefore, the calorific value of the above-mentioned high-temperature peak is calculated by heat flux differential scanning calorimetry by defining the area of the high-temperature peak Pd. In addition, the area of the above-mentioned endothermic peak Pd can be defined as follows.

For example, as shown in FIG. 2, the straight line α-β that connects the point α that corresponds to 80° C. on the DSC curve and the point β on the DSC curve that corresponds to the melt end temperature Te of the expanded beads is drawn. Next, a straight line that is in parallel to the vertical axis of the graph is drawn from the point γ on the DSC curve, which corresponds to the valley portion between the inherent peak Pc and the high-temperature peak Pd, and the intersection with the above-mentioned straight line α-β is defined as δ. The surface area of the high-temperature peak Pd is defined as the surface area of the part that is surrounded by the DSC curve that shows the high-temperature peak Pd of the DSC curve, the line segment δ-β and the line segment γ-δ (the shadowed area in FIG. 2). In addition, the reason why the point α on the DSC curve is defined as a point corresponding to a temperature of 80° C. so as to draw the straight line α-β, a base line, in the above-mentioned measurement process is based on that a base line connecting a point corresponding to 80° C. as a starting point and a melt end temperature as an end point is preferable for obtaining the calorific value of the high-temperature peak with fine reproducibility and stability.

In the present invention, the high-temperature peak Pd that is obtained by the adjusting process by the holding operation of the step of producing expanded beads mentioned below appears on the DSC curve of the first heating of the expanded beads measured as above, but does not appear on the DSC curve of the second heating that is measured by cooling from 200° C. to 25° C. at a cooling rate of 10° C./min and heating again to 200° C. at a heating rate of 10° C./min after the DSC curve of the first heating is measured, and only an endothermic peak similar to the inherent peak Pc appears on the DSC curve of the second heating; therefore, the inherent peak Pc and the higher-temperature peak Pd can be readily distinguished.

Furthermore, it is preferable that the expanded polyvinylidene fluoride resin beads of the present invention satisfy the condition of the following formula (1). When the condition of the following formula (1) is satisfied, a molded article of expanded beads having fine appearance and excellent mechanical properties can be obtained.

[Mathematical Formula 9]

$$0.5 \times B/A - 0.06 \leq D/C \leq 2 \times B/A - 0.3 \tag{1}$$

(A, B, C and D are similar to those described above.)

In the case when the value of the above-mentioned D/C satisfies the condition of the following formula (4), the shrinkage of the expanded beads becomes small, or closed cells of the expanded beads that are required for in-mold molding that gives fine appearance are increased, and thus a molded article having better appearance can be obtained.

[Mathematical Formula 10]

$$D/C \geqq 0.5 \times B/A - 0.06 \tag{4}$$

When the value of the above-mentioned D/C satisfies the condition of the following formula (5), the expanded beads are easily soften at the heating temperature during molding, and the temperature range for softening is broaden. Furthermore, since the shape of a mold cavity is maintained easily by melting of the expanded beads, a molded article having better appearance and excellent mechanical properties can be obtained.

[Mathematical Formula 11]

$$D/C \geqq 2 \times B/A - 0.3 \tag{5}$$

Figure 3:
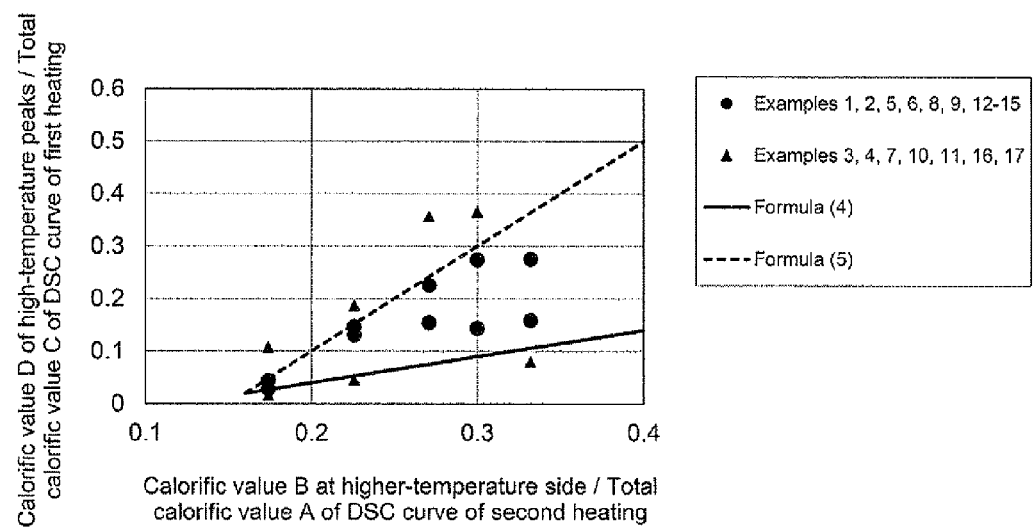
FIG. 3 is a drawing that shows the relationships between the calorific value B on the higher-temperature side than the peak temperature of the endothermic peak having the maximum area in the DSC curve of the second heating/the total calorific value A of the endothermic peak in the DSC curve of the second heating, and between the calorific value D of the high-temperature peak of the DSC curve of the first heating/the total calorific value C of the endothermic peak of the DSC curve of the first heating.

The above-mentioned formula (1) is based on FIG. 3, and shows that when B/A is plotted on the axis X and D/C is plotted on the axis Y and when said plots are in a specific range, the appearance and mechanical properties of the molded article of expanded beads are further improved. FIG. 3 shows that B/A of the DSC curve of the second heating that relates to the polyvinylidene fluoride resin itself that composes the expanded beads and D/C of the DSC curve of the first heating that attributes to the crystalline structure formed in the steps of the production of the expanded beads mutually relate to the appearance and mechanical properties of the molded article of the expanded beads.

For the range in which the appearance and mechanical properties of the molded article become excellent, as the value of B/A of the above-mentioned DSC curve of the second heating increases, the range of D/C that is defined within the range of the above-mentioned formula (1) tends to increase. On the other hand, when the value of B/A is small, the range of D/C that is defined within the range of the above-mentioned formula (1) tends to decrease.

The above-mentioned tendencies mean that, as B/A increases, the difference between the peak temperature of the endothermic peak having the maximum area of the above-mentioned DSC curve of the first heating and the peak temperature of the high-temperature peak increases, and the difference between the temperature at which softening of the resin of the expanded beads initiates and the temperature at which the entirety of the expanded beads is molten by melting of the crystalline that forms the high-temperature peak increases, and thus the molding range at which a better molded article can be obtained is broaden.

The above-mentioned formula (1) shows the tendency that the range of D/C at which a molded article having fine appearance and mechanical properties is obtained is broaden when the value of the above-mentioned B/A increases, with respect to the area that is surrounded with the two straight lines having different gradients (the formulas (4) and (5)). Specifically, the above-mentioned range is an area that is surrounded by the two formula having different gradients, the formula (4) as a lower limit and the formula (5) as an upper limit. When D/C is within the above-mentioned formula (1), the molded article of expanded beads has better appearance and mechanical properties.

Although the apparent density of the expanded beads of the present invention is not specifically limited as long as properties as a foamed article are ensured, it is approximately from 18 to 1,500 g/cm$^3$. The apparent density is preferably from 36 to 750 g/cm$^3$, more preferably from 54 to 500 g/cm$^3$. When said apparent density is too small, an expansion ratio is relatively high, and thus sufficient cells film strength may not be maintained during expansion by heating. When the apparent density is too high, basic properties as a foamed article may not be obtained.

A molded article of expanded beads that is obtained by filling the expanded beads having the above-mentioned apparent density in the cavity of a metal-mold for molding, heating the expanded beads by a heating medium, and conducting in-mold molding has an apparent density of approximately from 11 to 1,100 g/cm$^3$, more preferably from 22 to 550 g/cm$^3$, further preferably 33 to 400 g/cm$^3$.

The apparent density of the expanded beads and the apparent density of the molded article of the expanded beads in the present invention are calculated from the following measurement process.

(i) Measurement of Apparent Density of Expanded Beads

A measurement cylinder containing water of 23° C. is prepared, and about 500 ml of expanded beads that has been left for 2 days under conditions of a relative humidity of 50%, 23° C. and 1 atom (the weight of the group of the expanded beads: W1) are immersed in said measurement cylinder by using a metal mesh or the like, and dividing the weight of the group of the expanded beads W1 (g) in the measurement cylinder by the volume of the group of the expanded beads V1 (L) that is measured from increase in the water level (W1/V1).

(ii) Measurement of Density of Molded Article of Expanded Beads

The apparent density is obtained by cutting out a test piece of 50 mm×50 mm×50 mm from the part having no molded surface skin on the molded article of the expanded beads, and calculating from the volume V2 (L) and weight W2 (g) of the test piece.

The expanded beads of the present invention have an average cell diameter preferably from 35 to 800 μm. When the cell diameter is in the above-mentioned range, the secondary expansion during heat molding is sufficiently done and the fusion bonding property between the beads is improved, whereby a molded article having good appearance and mechanical properties can be obtained. The average cell diameter of the expanded beads is preferably from 50 to 500 more preferably from 60 to 350 μm.

The average cell diameter of the expanded beads can be obtained by, first cutting the expanded bead in approximately half to obtain cell cross-sectional surfaces, and carrying out the following operations based on an enlarged picture obtained by photographing said cross-sectional surfaces by a microscope. In above-mentioned enlarged picture of the cell cross-sectional surfaces, four straight lines that run from one surface of the expanded bead to the surface of the other bead and pass through the central areas of the cell cross-sectional surfaces are drawn in eight directions. Next, the total number of the cells that intersect with the above-mentioned four straight lines is obtained. Then, the value obtained by dividing the summation of the lengths of the above-mentioned respective four lines: L (μm) by the total number of the cells N (units) (L/N) is defined as the average cell diameter of the expanded beads.

Other polymer components and additives other than the polyvinylidene fluoride resin can be added to the expanded beads of the present invention by a kneading means or the like such as an extruder to the extent that the effects of the present invention are not deteriorated.

Examples of the above-mentioned other polymer components may include polyolefin resins such as high density polyethylenes, midium density polyethylenes, low density polyethylenes, linear very-low density polyethylenes, linear low density polyethylenes that are copolymers of ethylene and an α-olefin having 4 or more carbon atoms, ethylene-vinyl acetate copolymers, ethylene-acrylic acid copolymers, ethylene-methacrylic acid copolymers and polypropylene resins, or polystyrene resins such as polystyrene and styrene-maleic anhydride copolymers, rubbers such as ethylene-propylene rubbers, ethylene-1-butene rubbers, propylene-1-butene rubbers, ethylene-propylene-diene rubbers, isoprene rubbers, neoprene rubbers and nitrile rubbers, styrene thermoplastic elastomers such as styrene-diene block copolymers and hydrogenated products of styrene-diene block copolymers, polytetrafluoroethylenes, tetrafluoroethylene-perfluoroalkoxyethylene copolymers, tetrafluoroethylene-hexafluoropropylene copolymers, tetrafluoroethylene-ethylene copolymers, polytrifluoroethylene chloride, trifluoroethylene-ethylene copolymers, and the like.

These polymers can also be used as a combination of two or more kinds.

Furthermore, if desired, various additives that are generally used such as cell diameter controlling agents, antistatic agents, electrical conducting agents, lubricants, antioxidants, ultraviolet absorbing agents, flame retardants, metal deactivators, pigments, dyes, crystal nucleaous agents or fillers, and the like can be suitably incorporated into the polyvinylidene fluoride resin. Examples of the above-mentioned cell diameter controlling agents may include inorganic substances such as talc, sodium chloride, calcium carbonate, silica, titanium oxide, gypsum, zeolite, borax, aluminum hydroxide and carbon, as well as organic nucleus agents such as phosphate nucleus agents, phenol nucleus agents, amine nucleus agents and polytetrafluoroethylenes (PTFE). Although the amount to be added of these various additives differs depending on the purpose of addition, the amount is preferably 25 parts by weight or less, more preferably 15 parts by weight or less, further preferably 8 parts by weight or less, and specifically preferably 5 parts by weight or less, per 100 parts by weight of the polyvinylidene fluoride resin.

When two kinds of polyvinylidene fluoride resins that composes the expanded beads are used or other composes are mixed in the polyvinylidene fluoride resin that constitutes the expanded beads, it is important to mix them by using a kneader so that they become sufficiently uniform. The above-mentioned mixing is preferably performed by heating and kneading in an extruder to a temperature at which both resins are molten, and kneading the resins in an extruder. After the above-mentioned kneading, the kneaded product is extruded a strand through a small pores of a die attached to the tip of the extruder and cut the strand into suitable lengths, and granulated into resin beads each having a suitable size for the production of the expanded beads. The average weight per one resin bead is generally from 0.01 to 20.0 mg, and from 0.1 to 10.0 mg is specifically preferable.

For the production of the expanded beads of the present invention, for example, known expanding processes such as those described in, for example, Japanese Patent Application Publication Nos. 49-2183, 56-1344, 62-61227 and the like, which include dispersing polyvinylidene fluoride resin beads that are obtained by granulating by the above-mentioned process or the like and a blowing agent dispersing in a dispersing medium such as water in a sealed container, heating under stirring to soften the resin beads and impregnating the resin beads with the blowing agent, and discharging the resin beads together with the dispersing medium from the sealed container to a low pressure area (generally under atmospheric pressure) at a temperature equal to or higher than the softening temperature of the resin beads to expand the resin beads, can be used.

During discharging of the contents in the sealed container from the sealed container to the low pressure area for obtaining the expanded beads, it is preferable to discharge the contents while applying a back pressure to the inside of the sealed container by the expanding agent used or an inorganic gas such as nitrogen and air so that the pressure in said container is not decreased rapidly, in view of equalization of the apparent density of the obtained expanded beads. The dispersing medium for dispersing the resin beads during the production of the expanded beads is not limited to water mentioned above, and any solvent that does not dissolve the resin beads can be used. Although examples of the dispersing medium other than water may include ethylene glycol, glycerin, methanol, ethanol and the like, water is generally used.

Alternatively, it is also possible to obtain expandable resin beads by impregnating the above-mentioned resin beads with the blowing agent, and cooling without discharging to the low pressure area. Said expandable resin beads can be expanded by heating to give expanded beads.

In the above-mentioned process, in order for the resin beads to disperse uniformly in the dispersion medium, where necessary, it is preferable to add to and disperse into the dispersion medium dispersing agents such as poorly-water-soluble inorganic substances such as aluminum oxide, calcium triphosphate, magnesium pyrophosphate, zinc oxide, kaolin, mica and talc, and dispersing aids such as anionic surfactants such as sodium dodecylbenzenesulfonate and sodium alkanesulfonates. For the amount of the dispersing agent (including the dispersing aid) that is added to the dispersion medium during the production of the expanded beads, it is preferable to adjust the ratio of the weight of the resin beads to the weight of the dispersing agent (the weight of the resin beads/the weight of the dispersing agent) to from 20 to 2,000, further to from 30 to 1,000. Furthermore, it is preferable to adjust the ratio of the weight of the dispersing agent to the weight of the dispersing aid (the weight of the dispersing agent/the weight of the dispersing aid) to from 1 to 500, further to from 5 to 100.

As the blowing agent used in the above-mentioned process, organic physical blowing agents and inorganic physical blowing agents, or mixtures thereof, and the like can be used. Examples of the organic physical blowing agents may include aliphatic hydrocarbons such as propane, butane, hexane, pentane and heptane, alicyclic hydrocarbons such as cyclobutane and cyclohexane, halogenated hydrocarbons such as chlorofluoromethane, trifluoromethane, 1,1-difluoroethane, 1,1,1,2-tetrafluoroethane, methyl chloride, ethyl chloride and methylene chloride, dialkyl ethers such as dimethyl ether, diethyl ether and methyl ethyl ether, and the like, and these can be used as a mixture of two or more kinds. Furthermore, examples of the inorganic physical blowing agent may include nitrogen, carbon dioxide for also referred to as carbon dioxide gas), argon, air, water and the like, and these can be used as a mixture of two or more kinds. When the organic physical blowing agent and inorganic physical blowing agent are mixed and used, a combination of the compounds that are optionally selected from the above-mentioned organic physical blowing agents and inorganic physical blowing agents can be used. In addition, in the case when the inorganic physical blowing agent and organic physical blowing agent are used in combination, it is preferable to incorporate the inorganic physical blowing agent by at least 30% by weight or more.

Among the above-mentioned blowing agents, inorganic physical blowing agents are specifically preferable in view of environments, and among them, nitrogen, air, carbon dioxide and water are preferable. In addition, when water is used as a dispersion medium together with the resin beads in the sealed container when obtaining the expanded beads, water that is a dispersion medium can be used efficiently as a blowing agent by using said resin beads that have been kneaded with a water-absorbing resin or the like.

Although the use amount of the blowing agent is determined by considering the apparent density of the objective expanded beads, the kind of the polyvinylidene fluoride resin, or the kind of the blowing agent, and the like, it is generally preferable to use 5 to 50 parts by weight of the organic physical blowing agent and 0.5 to 30 parts by weight of the inorganic physical blowing agent per 100 parts by weight of the resin beads.

The expanded beads having the above-mentioned higher-temperature peaks of the present invention can be obtained by a process including dispersing polyvinylidene fluoride resin beads and a blowing agent in a dispersion medium such as water in a sealed container, heating under stirring to soften the resin beads and impregnate the resin beads with the blowing agent, and discharging the resin beads together with the dispersion medium to a low pressure area (generally under atmospheric pressure) from the sealed container at a temperature equal to or higher than the softening temperature of the resin beads, wherein during dispersing the resin beads in the dispersion medium in the sealed container and heating under stirring, the temperature is not raised to the melt end temperature Te of the resin beads or more but adjusted to an optional temperature Ta within the range from a temperature that is 15° C. lower than the melting point Tm of the resin beads to a temperature lower than the melt end temperature Te, and the temperature Ta is kept for a sufficient time period, preferably from about 10 to 60 minutes, thereafter the temperature is adjusted to an optional temperature Tb within the range from a temperature that is 15° C. lower than the melting point Tm of the resin beads (Tm −5° C.) to a temperature that is 5° C. higher than the melt end temperature Te (Te +5° C.), and the resin beads are discharged together with the dispersion medium from the sealed container to the low pressure area at that temperature and expanded. In addition, keeping within the range from the above-mentioned (Tm −15° C.) to lower than Te for forming the high-temperature peaks can be set to multi-steps within said temperature range, or said high-temperature peaks can also be formed by raising the temperature slowly over a sufficient time period within said temperature range.

Furthermore, formation of the above-mentioned high-temperature peaks of the expanded beads and the degree of the calorific value of the high-temperature peaks mainly depend on the above-mentioned temperature Ta, the retention time at the above-mentioned temperature Ta, the above-mentioned temperature Tb, and the heating rate within the range from (Tm−15° C.) to (Te+5° C.) with respect to the resin beads during the production of the expanded beads. The less the temperature Ta or temperature Tb is in the above-mentioned each temperature range, the longer the retention time within the range from (Tm−15° C.) to lower than Te is, and the slower the heating rate within the range from (Tm−15° C.) to lower than Te is, the more the calorific value of the above-mentioned high-temperature peak of the expanded beads tends to be. Meanwhile, the above-mentioned heating rate that is generally adopted is from 0.5 to 5° C./min. On the other hand, the higher the temperature Ta or temperature Tb is in the above-mentioned each temperature range, the shorter the retention time within the range from (Tm−15° C.) to lower than Te is, the faster the heating rate within the range from (Tm−15° C.) to lower than Te is, and the slower the heating rate within the range from Te to (Te+5° C.) is, the smaller the calorific value tends to be. By repeating preliminary experiments with considering these points, the conditions for the production of the expanded beads that show a desired calorific value of the high-temperature peaks can be found. In addition, the above-mentioned temperature range for the formation of the high-temperature peaks is a suitable temperature range therefor when an inorganic physical blowing agent (for example, carbon dioxide gas) is used as an blowing agent. Therefore, when the blowing agent is changed to an organic physical blowing agent, the suitable temperature range is shifted from above-mentioned temperature range to the lower-temperature side by about from 0 to 30° C., respectively, depending on the kind and use amount thereof.

The expanded polyvinylidene fluoride resin beads obtained by being discharged from the sealed container to the low pressure area by the above-mentioned process can be formed into expanded beads having a lower apparent density, by subjecting the expanded beads to a curing step under atmospheric pressure, which is generally performed after said discharging, followed by filling the expanded beads in a sealed container for pressurization, and subjected to a treatment by a pressurizing gas such as air to adjust the inner pressure of the expanded beads to from 0.01 to 0.6 MPa (G), followed by removing said expanded beads from said container and heating by using steam or hot air (these steps are hereinafter referred to as two-step expansion).

The molded article of the expanded beads of the present invention can be produced by adopting a batch-type in-mold molding process (for example, the molding processes described in Japanese Patent Application Publication Nos. 4-46217 and 6-49795, and the like), which includes performing an operation for increasing the inner pressure of the expanded beads, which is similar to the operation in the above-mentioned two-step expansion, as necessary, to adjust the inner pressure of the expanded beads to from 0.01 to 0.3 MPa (G); filling the expanded beads in the cavity of a conventionally known metal mold for in-mold molding of expanded thermoplastic resin beads, which can be heated and cooled, and can be opened and closed and sealed; supplying steam having a saturated vapor pressure of from 0.05 to 0.48

MPa (G), preferably from 0.08 to 0.42 MPa (G) to heat and inflate the expanded beads in the mold cavity; fuse-bonding the expanded beads to each other; and cooling the obtained molded article of expanded beads and removing the molded article from the inside of the cavity.

As the process for heating in the above-mentioned in-mold molding process, a conventionally known process in which heating processes such as one-direction flow heating, reversed one-direction heating and main heating are suitably combined can be adopted, and specifically, a process including heating the expanded beads by preliminary heating, one-direction flow heating, reversed one-direction heating and main heating in this order is preferable. As used herein, the one-direction flow heating means supplying a heating medium to the inner portion of either a male mold or female mold (hereinafter referred to as a chamber) to heat a cavity, followed by ejecting the heating medium from the chamber of the female mold or male mold (another mold with respect to the mold to which the heating medium has been supplied). The case when the mold to which the heating medium is supplied and the mold from which the heating medium is ejected are opposite to those of the case of the above-mentioned one-direction flow heating refers to reversed one-direction flow heating with respect to the above-mentioned unidirectional heating.

In addition, the above-mentioned saturated vapor pressure of from 0.05 to 0.48 MPa (G) during molding of the expanded beads is the maximum value of the saturated vapor pressure of the steam that is supplied to the inside of the mold in the in-mold molding step.

Alternatively, the molded article of the expanded beads of the present invention can also be produced by a continuous molding process (for example, the molding processes described in Japanese Patent Application Laid-Open Nos. 9-104026, 9-104027 and 10-180888, and the like), which contains adjusting the inner pressure of the expanded beads to from 0.01 to 0.3 MPa (G) as necessary; continuously supplying the expanded beads into a cavity that is formed by a belt that conveys the expanded beads continuously along the top and bottom of the inside of a passage having a heating area and a cooling area and the passage; inflating the expanded beads by supplying steam having a saturated vapor pressure of from 0.05 to 0.42 MPa (G) into the mold cavity during passing through the heating area; fuse-bonding the expanded beads to each other; thereafter passing the bonded expanded beads through the cooling area to cool the bonded expanded beads; and continuously removing the obtained molded article of the expanded beads and sequentially cut the molded article into suitable lengths.

In addition, as the condition for the operation when the expanded beads are actually subjected to in-mold molding, various conditions such as compression filling molding, addition of inner pressure to the expanded beads and the like can be selected.

EXAMPLES

Next, the present invention is further specifically explained by Examples.

(1) Production of Expanded Polyvinylidene Fluoride Resin Beads

Examples 1 to 4

Using a vinylidene fluoride-hexafluoropropylene copolymer (manufactured by Arkema, KYNAR FLEX #2850, melting point: 158° C., crystallization temperature: 135° C., MFR: 3 g/10 min (temperature: 230° C., load: 5 kg)) as a polyvinylidene fluoride resin, the cell diameter controlling agent described in the table was added by 1,500 ppm by weight based on 100 parts by weight of the above-mentioned resin and the polyvinylidene fluoride resin are melt-kneaded in a single-axial extruder of 40 mmϕ, and the obtained kneaded product was extruded through a small pores of a die attached to the tip of the extruder into strand, cooled, cut so that the weight of the strand resin beads become approximately 1.8 mg, and dried to give resin beads.

1 kg of the above-mentioned resin beads were charged together with 3.5 liters of water as a dispersion medium into a 5 liter sealed container equipped with a stirrer, 0.3 part by weight of kaolin as a dispersing agent, 0.004 part by weight of a surfactant: sodium alkylbenzene sulfonate as a dispersing aid and 0.01 part by weight of aluminum sulfonate were further added to the dispersion medium, carbon dioxide gas as an blowing agent was introduced to the inside of the sealed container up to a total pressure of 0.3 MPa, and the temperature was raised under stirring to the expansion temperature shown in the table. After the expansion temperature was attained, additional carbon dioxide gas was added to adjust the total pressure to 0.4 MPa, this temperature was kept for 15 minutes, an isothermal crystallization operation was performed so that a predetermined endothermic calorific value of the high-temperature peaks could be obtained, and the content was discharged under an atmospheric pressure to give the expanded beads shown in the table. Meanwhile, the parts by weight for indicating the used amounts of the above-mentioned cell diameter controlling agent, dispersing agent, surfactant, aluminum sulfate and blowing agent are ratios based on 100 parts by weight of the resin beads.

(2) Production of Molded Article of Expanded Beads

The expanded beads obtained as above were filled in a molding cavity of vertical length 150 mm×horizontal length 60 mm×thickness 50 mm, and in-mold molding was performed by steam heating under a molding pressure shown in the table (the saturated vapor pressure, and the steam pressure in the table represents gauge pressures) to give a molded article of the expanded beads. Said molded article of expanded beads was cured in an oven at 80° C. for 12 hours to give a molded article of expanded polyvinylidene fluoride resin beads.

The apparent density of the obtained molded article of the expanded beads and the results of the evaluations of said molded article of the expanded beads are shown in Table 1.

Examples 5 to 7

Resin beads and expanded beads, and molded articles of the expanded beads were obtained in a similar manner to Example 1, except that a vinylidene fluoride-hexafluoropropylene copolymer (manufactured by Arkema, KYAR FLEX #2800, melting point: 146° C., crystallization temperature: 122° C., MFR: 4 g/10 min (temperature: 230° C., load: 5 kg)) was used as the polyvinylidene fluoride resin. The evaluations of said molded articles of the expanded beads are shown in Table 2.

Examples 8 to 11 and Comparative Example 1

Resin beads and expanded beads, and molded articles of the expanded beads were obtained in a similar manner to Example 1, except that a vinylidene fluoride-hexafluoropropylene copolymer (manufactured by Arkema, KYNAR FLEX #2800, melting point: 143° C., crystallization temperature: 117° C., MFR: 5 g/10 min (temperature: 230° C., load: 5 kg)) was used as the polyvinylidene fluoride resin. The evaluations of said molded articles of the expanded beads are shown in Table 3. Meanwhile, the apparent density and cell diameter of the expanded beads of Comparative Example 1 could not be measured accurately due to breakage of the cells.

Examples 12 to 17

Resin beads and expanded beads, and molded articles of the expanded beads were obtained in a similar manner to Example 1, except that a vinylidene fluoride-hexafluoropropylene copolymer (manufactured by Solvay Solexis, SOLEF21508, melting point: 133° C., crystallization temperature: 94° C., MFR: 24 g/10 min (temperature: 230° C., load: 5 kg)) was used as the polyvinylidene fluoride resin. The evaluations of said molded articles of the expanded beads are shown in Table 4. However, Example 15 was expanded in two steps and subjected to molding under the conditions shown in Table 4.

The obtained molded articles of the expanded beads were evaluated as follows.
(1) Appearance of Molded Article
The molded article of the expanded beads was judged visually, and evaluated as follows.
1 shows that slight shrinkage was observed on the molded article.
2 shows that slight melting was observed on the molded article.
3 shows that the secondary expansion was insufficient and a part that was not smooth was observed on a part of the surface.
(2) Fuse-Bonding Between Expanded Beads in Molded Article On one surface of the surfaces of vertical length: 150 mm×horizontal length: 60 mm of the molded article that is molded in the mold cavity of vertical length: 150 mm×horizontal length: 60 mm×thickness: 50 mm, about 10 mm of a cut is made in the thickness direction of said molded article using a cutter knife so as to cut the length of said molded article into two equal lengths, and a value of the ratio (b/n) of the number of the expanded beads present on the broken-out section (n) and the number of the material-fractured expanded beads (b) is calculated by a test in which said molded article is fractured by folding said molded article from the cutting portion.

The stronger the fuse-bonding between the expanded beads is, the higher the value of the break test (b/n) becomes. In addition, a higher value of (b/n) is preferable since the fuse-bonding between the expanded beads becomes complete and the molded article has fine mechanical properties such as flexural strength and tensile strength. The number of the above-mentioned expanded beads (n) is the sum of the number of the expanded beads that are delaminated between the expanded beads and the number of the expanded beads that are material-fractured in the expanded beads (b).

TABLE 1

| | | | Example 1 | Example 2 | Example 3 | Example 4 |
|---|---|---|---|---|---|---|
| Expanded beads | Apparent density | g/cm³ | 134 | 199 | 121 | 585 |
| | Average cell diameter | μm | 100 | 63 | 105 | 71 |
| DSC curve of first heating | Total calorific value of endothermic peak C | J/g | 46.4 | 45.4 | 43.4 | 44.3 |
| | Calorific value of high-temperature peaks D | J/g | 1.3 | 2 | 0.7 | 4.8 |
| DSC curve of second heating | Total calorific value of endothermic peak A | J/g | 46 | 46 | 46 | 46 |
| | Peak temperature of endothermic peak (maximum area) | ° C. | 158.2 | 158.2 | 158.2 | 158.2 |
| | Calorific value on higher-temperature side B | J/g | 8 | 8 | 8 | 8 |
| Conditions for expansion | Expansion temperature | ° C. | 153 | 152 | 154 | 151 |
| | Carbon dioxide gas | MPa | 4 | 4 | 4 | 4 |
| | Cell controlling agent | — | PTFE | PTFE | PTFE | — |
| Two-step expansion | Pretreatment (application of inner pressure) | MPa | — | — | — | — |
| | Steam pressure for two-step expansion | MPa | — | — | — | — |
| | Bulk density | g/cm³ | — | — | — | — |
| In-mold molding | Treatment before molding (application of inner pressure) | MPa | 0 | 0 | 0 | 0 |
| | Minimum steam pressure for molding | MPa | 0.38 | 0.46 | 0.36 | 0.46 |
| | Apparent density of molded article | g/cm³ | 115 | 157 | 114 | 479 |
| Evaluations | Appearance of molded article | — | Fine | Fine | *1 | *3 |
| | fuse-bonding between expanded beads | — | 0.9 or more | 0.9 or more | 0.9 or more | 0.9 or more |

TABLE 2

|  |  |  | Example 5 | Example 6 | Example 7 |
|---|---|---|---|---|---|
| Expanded beads | Apparent density | g/cm³ | 146 | 462 | 415 |
|  | Average cell diameter | μm | 50 | 108 | 32 |
| DSC curve of first heating | Total calorific value of endothermic peak C | J/g | 36.7 | 32.7 | 32.6 |
|  | Calorific value of higher-temperature peaks D | J/g | 5.3 | 9 | 11.9 |
| DSC curve of second heating | Total calorific value of endothermic peak A | J/g | 32 | 32 | 32 |
|  | Peak temperature of endothermic peak (maximum area) | °C. | 146.1 | 146.1 | 146.1 |
|  | Calorific value on higher-temperature side B | J/g | 9.6 | 9.6 | 9.6 |
| Conditions for expansion | Expansion temperature | °C. | 149 | 143 | 143 |
|  | Carbon dioxide gas | MPa | 4 | 4 | 4 |
|  | Cell diameter controlling agent | — | PTFE | — | PTFE |
| Two-step expansion | Pretreatment (application of inner pressure) | MPa | — | — | — |
|  | Steam pressure for two-step expansion | MPa | — | — | — |
|  | Bulk density | g/cm³ | — | — | — |
| In-mold molding | Treatment before molding (application of inner pressure) | MPa | 0 | 0 | 0 |
|  | Minimum steam pressure for molding | MPa | 0.32 | 0.42 | 0.46 |
|  | Apparent density of molded article | g/cm³ | 105 | 350 | 400 |
| Evaluations | Appearance of molded article | — | Fine | Fine | *3 |
|  | Fuse-bonding between expanded beads | — | 0.9 or more | 0.9 or more | 0.1 or less |

TABLE 3

|  |  |  | Example 8 | Example 9 | Example 10 | Example 11 | Comparative Example 1 |
|---|---|---|---|---|---|---|---|
| Expanded beads | Apparent density | g/cm³ | 245 | 354 | 241 | 502 | — |
|  | Average cell diameter | μm | 141 | 169 | 249 | 97 | — |
| DSC curve of first heating | Total calorific value of endothermic peak C | J/g | 27.4 | 31.3 | 26.2 | 31.5 | 26.1 |
|  | Calorific value of higher-temperature peaks D | J/g | 3.6 | 4.6 | 1.2 | 5.9 | 0.4 |
| DSC curve of second heating | Total calorific value of endothermic peak A | J/g | 28.8 | 28.8 | 28.8 | 28.8 | 28.8 |
|  | Peak temperature of endothermic peak (maximum area) | °C. | 143.1 | 143.1 | 143.1 | 143.1 | 143.1 |
|  | Calorific value on higher-temperature side B | J/g | 6.5 | 6.5 | 6.5 | 6.5 | 6.5 |
| Conditions for expansion | Expansion temperature | °C. | 140 | 139 | 145 | 138 | 148 |
|  | Carbon dioxide gas | MPa | 4 | 4 | 4 | 4 | 4 |
|  | Cell diameter controlling agent | — | NaCl | — | NaCl | Al hydroxide | Al hydroxide |
| Two-step expansion | Pretreatment (application of inner pressure) | MPa | — | — | — | — | — |
|  | Steam pressure for two-step expansion | MPa | — | — | — | — | — |
|  | Bulk density | g/cm³ | — | — | — | — | — |
| In-mold molding | Treatment before molding (application of inner pressure) | MPa | 0 | 0 | 0 | 0 | — |
|  | Minimum steam pressure for molding | MPa | 0.24 | 0.3 | 0.22 | 0.38 | — |
|  | Apparent density of molded article | g/cm³ | 157 | 254 | 226 | 408 | — |
| Evaluations | Appearance of molded article | — | Fine | Fine | *1 | *3 | Molding was impossible |
|  | Fuse-bonding between expanded beads | — | 0.9 or more | 0.9 or more | 0.9 or more | 0.9 or more | — |

TABLE 4

| | | | Example 12 | Example 13 | Example 14 | Example 15 | Example 16 | Example 17 |
|---|---|---|---|---|---|---|---|---|
| Expanded beads | Apparent density | g/cm³ | 231 | 253 | 245 | 60 | 286 | 434 |
| | Average cell diameter | μm | 143 | 36 | 259 | 114 | 385 | 75 |
| DSC curve of first heating | Total calorific value of endothermic peak C | J/g | 26.4 | 26.1 | 24.5 | 24.8 | 25 | 24.6 |
| | Calorific value of higher-temperature peaks D | J/g | 4.2 | 7.2 | 3.8 | 5.6 | 2 | 8.9 |
| DSC curve of second heating | Total calorific value of endothermic peak A | J/g | 23.8 | 23.8 | 21.7 | 21.7 | 23.8 | 21.7 |
| | Peak temperature of endothermic peak (maximum area) | °C | 133.3 | 133.3 | 133.6 | 133.6 | 133.3 | 133.6 |
| | Calorific value on higher-temperature side B | J/g | 7.9 | 7.9 | 5.9 | 5.9 | 7.9 | 5.9 |
| Conditions for expansion | Expansion temperature | °C | 131 | 128 | 131 | 129 | 134 | 126 |
| | Carbon dioxide gas | MPa | 4 | 4 | 4 | 4 | 4 | 4 |
| | Cell diameter controlling agent | | NaCl | PTFE | Al hydroxide | NaCl | — | NaCl |
| Two-step expansion | Pretreatment (application of inner pressure) | MPa | — | — | — | 0.06 | — | — |
| | Steam pressure for two-step expansion | MPa | — | — | — | 0.086 | — | — |
| | Bulk density | g/cm³ | — | — | — | 63 | — | — |
| In-mold molding | Treatment before molding (application of inner pressure) | MPa | 0.08 | 0.08 | 0.07 | 0.08 | 0 | 0 |
| | Minimum steam pressure for molding | MPa | 0.16 | 0.2 | 0.16 | 0.13 | 0.16 | 0.24 |
| | Apparent density of molded article | g/cm³ | 88 | 187 | 101 | 47 | 268 | 434 |
| Evaluations | Appearance of molded article | — | Fine | Fine | Fine | Fine | *1 | *2 |
| | Fuse-bonding between expanded beads | — | 0.9 or more | 0.9 or more | 0.9 or more | 0.9 or more | 0.9 or more | 0.9 or more |

INDUSTRIAL APPLICABILITY

The expanded beads of the present invention are expanded beads that can be molded by in-mold molding can provide a molded article of the expanded beads having a shape corresponding to the mold cavity, and can save the weight of the molded article while substantially keeping the advantages of a polyvinylidene fluoride resin of excellent weather resistance and fire retardancy, and are useful as a non-contaminating material for applications in heat insulating materials in clean rooms, and applications in heat insulating materials, sound insulating materials, shock-absorbing materials and the like out of doors, which utilize weather resistance, as well as applications in heat insulating materials and shock-absorbing materials in railroad vehicles, aerospace field vehicles and the like, as a soft expanded article for advanced flame-retardant applications utilizing fire retardancy.

| | Reference Signs List |
|---|---|
| B: | the calorific value at the higher-temperature side than the peak temperature of the endothermic peak having the maximum area in the DSC curve of the second heating. |
| D: | the calorific value of the endothermic peak (high-temperature peak) on the higher-temperature side than the inherent peak of the resin in the DSC curve of the first heating. |
| Tm: | the peak temperature of the endothermic peak at the maximum area of the DSC curve of the second heating. |
| PTmc: | the peak temperature of the inherent peak of the resin in the DSC curve of the first heating. |
| PTmd: | the peak temperature of the high-temperature peak in the DSC curve of the first heating. |
| Pc: | the inherent peak in the DSC curve of the first heating. |
| Pd: | the high-temperature peak in the DSC curve of the first heating. |
| α: | the point that corresponds to the melt initiation temperature of the resin in the DSC curve. |
| β: | the point that corresponds to the melt end temperature of the resin in the DSC curve. |
| γ: | the point on the DSC curve corresponding to the valley portion between the inherent peak and high-temperature peak in the DSC curve. |
| δ: | the intersection of the straight line that is parallel to the vertical axis of the graph with the straight line that connects the point α and point β. |

The invention claimed is:

1. An expanded polyvinylidene fluoride resin beads, wherein a DSC curve that is measured when from 1 to 3 mg of the expanded fluoride resin beads are heated from 25° C. to 200° C. at a heating rate of 10° C./min by a heat flux differential scanning calorimetry (a DSC curve of first heating) has an endothermic peak that is inherent peak in the polyvinylidene fluoride resin and one or more endothermic peaks (high-temperature peaks) on the higher-temperature side of the inherent peak, and the high-temperature peaks have a calorific value of 0.5 to 30 J/g.

2. The expanded polyvinylidene fluoride resin beads according to claim 1, wherein a DSC curve that is measured when from 1 to 3 mg of the expanded polyvinylidene fluoride resin beads are heated from 25° C. to 200° C. at a heating rate of 10° C./min and cooled from 200° C. to 25° C. at a cooling rate of 10° C./min, and heated again from 25° C. to 200° C. at a heating rate of 10° C./min by a heat flux differential scanning calorimetry (a DSC curve of second heating) and the DSC curve of the first heating satisfy the condition of the following formula (1),

[Mathematical Formula 1]

$$0.5 \times B/A - 0.06 \leq D/C \leq 2 \times B/A - 0.3 \quad (1)$$

wherein A represents the total calorific value of the endothermic peak of the DSC curve of the second heating, B represents the calorific value on the higher-temperature side than the peak temperature of the endothermic peak having the maximum area of the DSC curve of the second heating, C represents the total calorific value of the endothermic peak of the DSC curve of the first heating, and D represents the calorific value of the high-temperature peaks in the DSC curve of the first heating, respectively.

3. The expanded polyvinylidene fluoride resin beads according to claim 2, wherein the total calorific value A of the endothermic peak and the calorific value B on the higher-temperature side than the peak temperature of the endothermic peak having the maximum area satisfy the condition of the following formula (2) in the DSC curve of the second heating

[Mathematical Formula 3]

$$0.16 \leq B/A \leq 0.80 \tag{2}.$$

4. The expanded polyvinylidene fluoride resin beads according to claim 1, wherein the polyvinylidene fluoride resin that composes the expanded polyvinylidene fluoride resin beads is a vinylidene fluoride-tetrafluoroethylene copolymer or a vinylidene fluoride-hexafluoropropylene copolymer.

5. A molded article of expanded polyvinylidene fluoride resin beads, which is obtained by in-mold molding of the expanded polyvinylidene fluoride resin beads according to claim 1.

6. The expanded polyvinylidene fluoride resin beads according to claim 2, wherein the polyvinylidene fluoride resin that composes the expanded polyvinylidene fluoride resin beads is a vinylidene fluoride-tetrafluoroethylene copolymer or a vinylidene fluoride-hexafluoropropylene copolymer.

7. The expanded polyvinylidene fluoride resin beads according to claim 3, wherein the polyvinylidene fluoride resin that composes the expanded polyvinylidene fluoride resin beads is a vinylidene fluoride-tetrafluoroethylene copolymer or a vinylidene fluoride-hexafluoropropylene copolymer.

8. A molded article of expanded polyvinylidene fluoride resin beads, which is obtained by in-mold molding of the expanded polyvinylidene fluoride resin beads according to claim 2.

9. A molded article of expanded polyvinylidene fluoride resin beads, which is obtained by in-mold molding of the expanded polyvinylidene fluoride resin beads according to claim 3.

10. A molded article of expanded polyvinylidene fluoride resin beads, which is obtained by in-mold molding of the expanded polyvinylidene fluoride resin beads according to claim 4.

* * * * *